June 18, 1968  S. GIANAKOS ET AL  3,389,195
PROCESS FOR MOLDED STRUCTURES HAVING FOAM CORES
Filed April 4, 1963  2 Sheets-Sheet 1
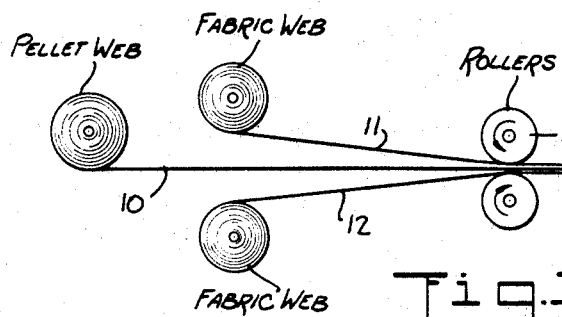
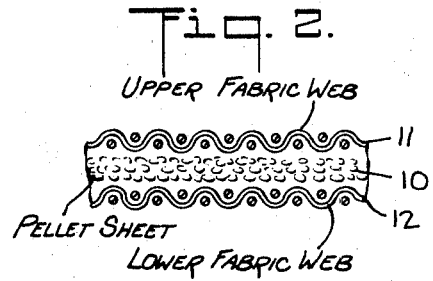
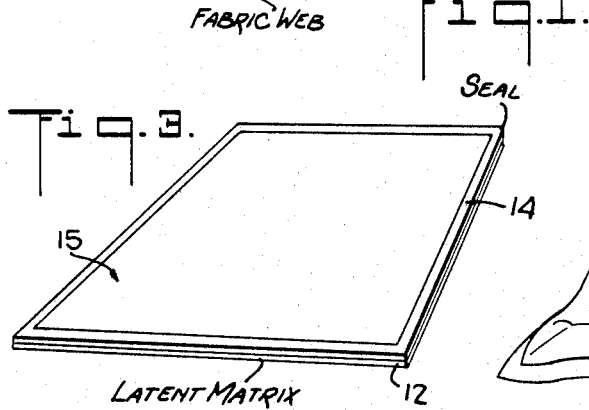
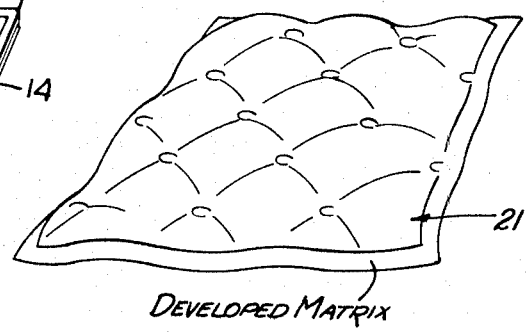
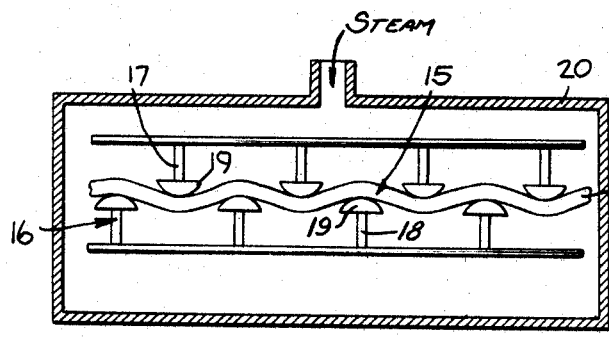
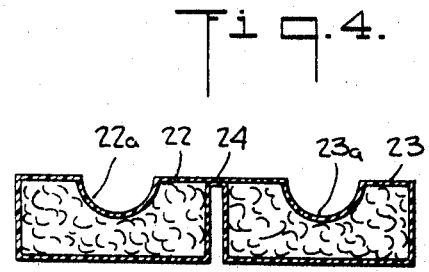
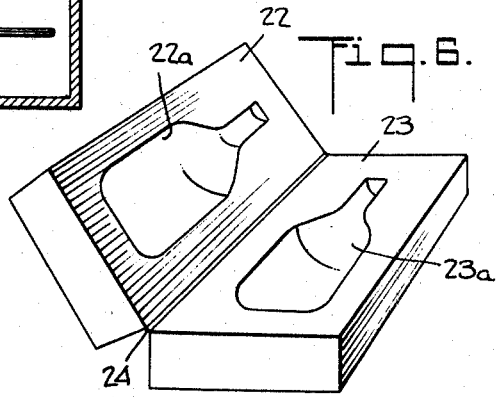
INVENTORS
S. STYLIANOS
A. I. MORRISON
BY
ATTORNEY

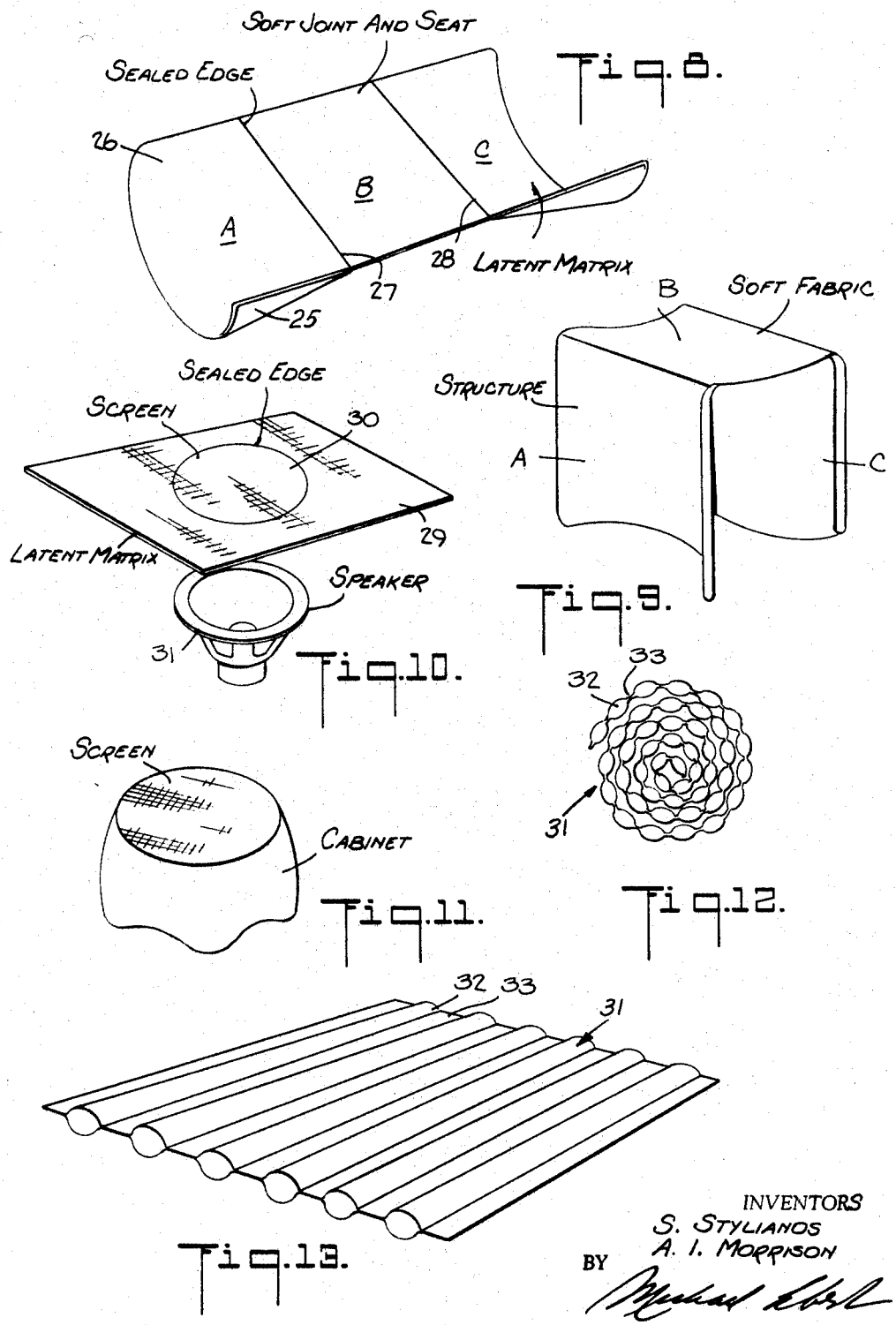

United States Patent Office 3,389,195
Patented June 18, 1968

3,389,195
PROCESS FOR MOLDED STRUCTURES
HAVING FOAM CORES
Stylianos Gianakos, 330 W. 174th St., New York, N.Y.
10033, and Andrew Ivar Morrison, 327 Washington
Ave., Brooklyn, N.Y. 11205
Filed Apr. 4, 1963, Ser. No. 270,612
1 Claim. (Cl. 264—45)

This invention relates generally to the production of structures having foam plastic cores, and more particularly to a structural matrix containing foam-forming granules within a stretchable envelope which may be molded by the application of heat and directional tension to define any desired structural configuration.

One known type of foam plastic material is that produced by heating granules or pellets of polystyrene. When subjected to heat, the granules expand or explode and then fuse together to form a rigid, light-weight material. Foamed polystyrene has excellent mechanical and thermal properties and is resistant to moisture, acids and alcohol.

Heretofore, the conventional practice has been to foam the pellets in place as by introducing a small charge of granules into the voids of a rigid structural member, such as honeycomb, and then applying heat thereto to cause the granules to explode and fill the voids. Such structures are useful as light-weight aircraft panels of high strength and for refrigerator walls having heat insulating characteristics, as well as in numerous other applications. In all cases, the granules are introduced into the voids of a formed body whose shape is predetermined.

The primary object of the present invention is to provide a material in which foam-forming granules are contained within a stretchable envelope which when subjected to heat and tension assumes and maintains a desired configuration.

A significant advantage of the invention is that the matrix may be molded to conform to any complex form, such as that of an elaborately shaped bottle, or any other fragile object, and thereafter used as a protective container therefor. Fragile objects are presently packaged in wood or corrugated board boxes, and to ensure safety it is necessary to stuff the box in the free areas surrounding the object with excelsior or other protective material. With a molded matrix in accordance with the invention, it is only necessary to nest the object within a well conforming thereto, the matrix serving as a self-sufficient shipping container in which the cellular foam plastic serves as a protective blanket, and the envelope as an exterior wall or skin.

More specifically, it is an object of the invention to provide a latent matrix constituted by polystyrene granules contained within a sealed envelope formed of knitted paper or other yarn or porous mat material, which matrix when developed by heat and directional tension expands to assume a desired shape, and thereafter rigidifies to maintain said shape.

Also an object of this invention is to provide complex structures constituted by two or more latent matrixes joined together by the same fabric material forming the envelopes whereby when the latent matrixes are developed the junction areas form hinges or elastic membranes.

The shapes produced in developing the latent matrix may assume any natural form, and provide sculptured effects heretofore attainable only by complex molding procedures. Moreover, the thermal properties of the developed matrix are useful in such applications where it is desired to maintain cold or hot temperature conditions.

By the use of attractive stretchable fabrics for the envelope, it is possible to produce many useful forms having highly presentable surfaces. Thus the matrix may be molded into the shape of a corrugated panel for use in vertical walls, ceilings and room dividers. Panels in accordance with the invention may be provided with a fabric surface having many decorative as well as structural possibilities.

Yet another object of the invention is to provide a low-cost and efficient technique for producing latent matrixes in a continuous process.

Briefly stated, these objects are accomplished in one preferred embodiment of the invention by sandwiching a sheet formed by interconnected foam-forming pellets between two outer sheets of stretchable material, and then sealing together the margins of the outer sheets to form an envelope enclosing the pellets. The latent matrix thus formed is developed by subjecting selected areas thereof to directional tension and applying heat to the matrix, causing the pellets within the envelope to explode and thereby expand in those regions of the envelope which are not under tension and are free to stretch. As a consequence, the foam plastic assumes a desired shape, and the stretchable envelope conforms to the plastic body and adheres thereto, the envelope acting as a tension skin maintaining the foam under compression.

For a better understanding of the invention, as well as other objects and further features thereof, reference is made to the following detailed description to be read in conjunction with the accompanying drawing, wherein:

FIG. 1 is a schematic diagram showing how the stretchable fabric sheets and a sheet of foam-forming pellets are combined;

FIG. 2 is a section taken through the combination;

FIG. 3 shows in perspective the resultant latent matrix;

FIG. 4 illustrates schematically how the latent matrix is developed;

FIG. 5 shows in perspective a developed matrix;

FIG. 6 is a perspective view of a bottle container;

FIG. 7 is a section taken through another developed matrix intended as a protective container for a bottle;

FIG. 8 is a perspective view of a complex latent matrix intended to form a chair having a soft fabric seat;

FIG. 9 shows the erected seat after the latent matrix is developed;

FIG. 10 shows in perspective a complex latent matrix intended to provide a loud speaker enclosure;

FIG. 11 shows the developed speaker matrix;

FIG. 12 is a latent matrix roll intended to form a room divider; and

FIG. 13 shows the developed room divider.

Referring now to the drawing, and in particular to FIGS. 1 and 2, there is illustrated the first step in accordance with the invention for forming one embodiment of a latent matrix. Drawn from respective supply rolls are a web of foam-forming pellets 10, a first web 11 of stretchable fabric, and a second web 12 of stretchable fabric.

The foam-forming pellets are preferably polystyrene granules in discrete form which are adhesively interbonded to form a continuous, flexible sheet thereof. This may be accomplished by wetting the loose pellets with a solution of a water-soluble resin, such as the resin known commercially as Polyox or the bonding agents disclosed in the patent to Hiler 2,862,834, and passing the wetted pellets through a hopper into rolls whose separation is equal to the thickness of the desired sheet. The wet sheet emerging from the rolls is permitted to dry in air, or is conveyed through a heating chamber, whereby an elastic resinous bond is formed between the loose pellets thereby converting them into a continuous web which may be wound about a supply reel for further processing.

Alternatively, in lieu of Polyox, a water soluble or heat activated adhesive may be used to form the loose pellets into a cake, such that after expansion the heat activated adhesive serves to bond the foam plastic to the fabric skin.

The fabric webs 11 and 12 are formed of a stretchable or expansible material, preferably constituted by a knit paper having a vinyl or other thermoplastic coating. These webs may alternatively be made by other forms of stretchable material, such as non-woven paper and knit textile yarns of synthetic or natural material. The nature of the knit should be such that the material is stretchable in both the warp and the woof directions.

By passing the three webs through combining rolls 13, a continuous sandwich is formed, as shown in FIG. 2. This sandwich is sectioned to a desired dimension, and the edges of the outer webs 11 and 12 are sewn together or otherwise connected along the margins 14, to define a flat envelope totally enclosing the sheet of foam-forming pellets. This pellet-filled envelope, which is shown in FIG. 3, constitutes the latent matrix. Where the outer sheets are coated with a thermoplastic layer, the marginal sealing may be effected by heat-sealing techniques effecting interior bonding of the thermoplastic layers.

The latent matrix, generally designated by numeral 15, is then subjected to directional tension. For purposes of illustration only, we shall assume that the technique is for the purpose of fabricating panels having a quilted configuration, as shown in FIG. 5. To this end, the latent matrix is inserted, as shown in FIG. 4, between upper and lower tensioning elements 16 and 17, each of which is provided with projecting rods 18 having dome-shaped heads 19 which engage the upper and lower surfaces of matrix 15.

The tensioned latent matrix is placed within a heating cabinet 20 and steam is introduced therein to cause the pellets within the envelope to expand within those areas within the envelope not under tension. Thus the envelope puffs up and the fabric stretches in conformity therewith to produce the quilted structure constituting the developed matrix 21 shown in FIG. 5.

It will be appreciated that any desired pattern may be imparted to the developed matrix by changing the direction and extent of tensioning. The pellets when converted to foam penetrate the pores of the paper yarns and forms a bond therewith whereby when the foam hardens, the fabric envelope assumes a correspondingly shaped form throughout which the fabric is more or less stretched, depending on the degree of expansion.

A great variety of structural configurations may be produced by the process disclosed herein, in combination with stretchable fabric envelopes of different materials and colors, providing a decorative exterior having many ornamental possibilities.

Instead of combining two sheets of stretchable fabric with a sheet of pellets, as shown in FIG. 1, it is also possible to coat one of fabric sheets with an adhesive and to lay the loose pellets thereon, whereby this fabric sheet is then provided with a layer of pellets. This pellet covered sheet may be combined with a second sheet, and then processed as described above. In some cases, the pellet coated sheet may be wrapped directly about a form, and then subjected to heat, whereby the form is then embedded in a foam plastic body having an elastic skin in tension.

In the technique disclosed above, all of the pellets within the envelope are exploded. It is, however, possible to selectively heat the latent matrix whereby pellets in certain areas are not expanded and do not rigidify, thereby forming in those areas a flexible, non-mechanical joint. This is illustrated in the structure shown in FIGS. 6 and 7, wherein the latent matrix is molded to provide a container for a bottle, the container being constituted by two sections 22 and 23 joined together by a hinge 24. The entire container is made from a single matrix envelope, a transverse central area of which is unheated to produce the flexible joint 24. The remaining portions of the envelope are heated under tension to form the sections 22 and 23 having depressions 22a and 23a therein, each of which is in the shape of a half-bottle, whereby when the sections are folded together, they surround and protect a bottle housed in the depressions.

In its simplest form the invention is constituted by a straightforward latent matrix which when heated assumes a desired shape. It is also possible to form more complex matrixes in which the envelope is filled only in selected areas with foam forming pellets, the other areas being free of such pellets consisting only of the fabric skin. Thus in FIG. 8, the complex matrix is constituted by two sheets of flexible fabric 25 and 26 forming an envelope whose edges are sealed along the periphery, the sheets also being sealed together along lines 27 and 28 to divide the envelope into hinged sections A, B and C. The end sections A and C are filled with foam pellets, whereas the center section B is free of pellets.

By heating the end sections A and C in a shaped mold, these sections are transformed into rigid plastic walls whose bases are inwardly curved as shown in FIG. 9, the rigid sections being joined together by the elastic section B of plastic material. The third panel may be folded to form a seat in which the rigid wall sections provide a firm support for the flexible section.

Using a similar technique, the unfilled portions of the complex matrix may not only be used to form hinges, but also act as fabric handles and serve many other purposes. Thus, as shown in FIGS. 10 and 11, the complex latent matrix 29 may be in the form of a rectangular envelope having a circular central portion 30 which is unfilled with pellets, the periphery of this portion as well as the perimeter of the matrix being sealed. The other portions of the matrix are filled with pellets. This structure is intended as a cabinet for a loud speaker 31, the central portion 30 serving as a sound permeable grille, the remaining portion which embraces the speaker acting as an acoustic baffle therefor when expanded. There is no need to attach the speaker to the matrix, for the foam expands thereabout to hold it in place.

The same principle may be used to form a room divider, as shown in FIGS. 12 and 13, wherein the latent matrix 31 is originally in roll form and is divided into alternate pellet-filled and pellet-free sections 32 and 33. The free sections act not only as hinges which permit the room divided to be arranged in any configuration, but they are porous and admit light and air. This divider, while very light and easily set up, is of great strength and has many structural uses.

While steam heating has been disclosed, it is to be understood that the pellets may be exploded by dielectric heating methods or other means to impart heat thereto. It is intended, therefore, in the appended claim to cover all such changes and modifications as fall within the true spirit of the invention.

We claim:

1. The method of forming a shaped structure having a foam plastic core, comprising the steps of:
   (A) filling an envelope made of a knitted fabric material stretchable in all directions with foam-forming polystyrene pellets,
   (B) sealing the filled envelope to form a latent matrix,
   (C) applying limiting elements to selected areas of the latent matrix to prevent expansion thereof, and
   (D) heating the latent matrix to cause the pellets therein to foam and thereby cause the stretchable envelope to expand only in those regions which are not limited and therefore free to stretch, to produce a shaped structure in which the envelope acts as a tension skin to maintain the foam under compression.

References Cited

UNITED STATES PATENTS

| | | | |
|---|---|---|---|
| 2,989,783 | 6/1961 | Slapnik | 264—45 |
| 2,607,104 | 8/1952 | Foster | 156—85 X |
| 2,981,954 | 5/1961 | Garbellano | 2—2.1 |
| 2,122,372 | 6/1938 | Hooper et al. | 264—45 X |
| 2,620,493 | 12/1952 | Brelsford | 156—292 X |
| 2,973,295 | 2/1961 | Rodgers | 264—45 X |
| 2,663,527 | 12/1953 | Joslyn. | |
| 2,770,406 | 11/1956 | Lane | 161—161 X |
| 2,862,834 | 12/1958 | Hiler | 161 |
| 2,891,288 | 6/1959 | Daley | 161—161 X |
| 2,959,508 | 11/1960 | Graham et al. | 161—161 X |
| 2,972,559 | 2/1961 | Allen et al. | 161—161 X |
| 2,976,577 | 3/1961 | Gould | 161—161 X |

FOREIGN PATENTS 801,388  9/1958  Great Britain.

EARL M. BERGERT, *Primary Examiner.*

T. R. SAVOIE, *Assistant Examiner.*